(12) United States Patent
Sansom-Wai et al.

(10) Patent No.: US 6,411,331 B1
(45) Date of Patent: *Jun. 25, 2002

(54) AUTOMATIC WHITE BALANCE DETECTION AND CORRECTION OF AN IMAGE CAPTURED IN A DIGITAL CAMERA

(75) Inventors: Cindy Y. Sansom-Wai, San Diego; Kirt A. Winter, Escondido; Paul M. Hubel, Mountain View, all of CA (US)

(73) Assignee: Hewlett-Packard Company, PaloAlto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/808,918

(22) Filed: Feb. 28, 1997

(51) Int. Cl.[7] .................................................. H04N 9/73
(52) U.S. Cl. ........................ 348/223; 348/655; 348/228
(58) Field of Search ................................. 348/223, 224, 348/226, 227, 228, 370, 655, 649, 650, 651, 29, 30, 33, 32, 153, 453

(56) References Cited

U.S. PATENT DOCUMENTS

| | | | |
|---|---|---|---|
| 3,822,393 A | 7/1974 | Karpol | 315/241 P |
| 4,050,085 A | 9/1977 | Prince et al. | 358/219 |
| 4,308,551 A | 12/1981 | Ohnuma et al. | 358/10 |
| 4,366,501 A | 12/1982 | Tsunekawa et al. | 358/310 |
| 4,495,520 A | 1/1985 | Kravitz et al. | 358/219 |
| 4,499,487 A | 2/1985 | Takayama et al. | 358/41 |
| 4,504,866 A | 3/1985 | Saito | 358/213 |
| 4,509,077 A | 4/1985 | Therrien | 358/139 |
| 4,525,741 A | 6/1985 | Chahal et al. | 358/212 |
| 4,532,918 A | 8/1985 | Wheeler | 128/6 |
| 4,564,856 A | 1/1986 | Sanderson et al. | 358/10 |
| 4,567,509 A | 1/1986 | Takayama et al. | 358/29 |
| 4,589,023 A | 5/1986 | Suzuki et al. | 358/213 |
| 4,635,126 A | 1/1987 | Kinoshita | 358/228 |
| 4,677,489 A | 6/1987 | Nishimura et al. | 358/213.13 |
| 4,714,962 A | * 12/1987 | Levine | 348/64 |
| 5,182,636 A | * 1/1993 | Kikuchi et al. | 348/225 |
| 5,295,204 A | * 3/1994 | Parulski | 382/167 |
| 5,325,185 A | * 6/1994 | Tsuchiva | 348/223 |
| 5,398,065 A | 3/1995 | Okino | 348/371 |
| 5,589,879 A | * 12/1996 | Saito et al. | 348/223 |
| 5,612,738 A | * 3/1997 | Kim | 348/223 |
| 5,617,139 A | * 4/1997 | Okine | 348/223 |
| 5,995,142 A | * 11/1999 | Matsufune | 348/223 |
| 6,181,374 B1 | * 1/2001 | Saito et al. | 348/223 |

FOREIGN PATENT DOCUMENTS

| | | | |
|---|---|---|---|
| EP | 0669752 A2 | 8/1995 | 1/40 |
| EP | 0719036 A2 | 6/1996 | 1/64 |
| EP | 0738085 A2 | 10/1996 | 9/73 |

OTHER PUBLICATIONS

"Color in Perspective," G. D. Finlayson, IEEE Transactions on Pattern Analysis and Machine Intelligence, vol. 18, No. 10, Oct. 1996.*

* cited by examiner

Primary Examiner—Wendy R. Garber
Assistant Examiner—Jacqueline Wilson

(57) ABSTRACT

A digital camera includes a lens and a plurality of color filters adjacent the lens. An array of detectors such as CCDs each receive, through the lens and a corresponding one of the color filters, light reflected from a scene. Each detector outputs a signal representative of an amount of light it receives. Circuitry is connected to the array for processing the signals from the detectors and generating a set of digital image data including a chromaticity value and a luminance value of a plurality of pixels representing an uncorrected image of the scene. A control circuit maps a two-dimensional representation of the digital image data into a two-dimensional representation of a set of reference image data and adjusts selected ones of the values of the set of digital image data in accordance with a predetermined transform to white balance the uncorrected image of the scene and produce a modified set of digital image data representing a corrected image of the scene.

12 Claims, 1 Drawing Sheet

AUTOMATIC WHITE BALANCE DETECTION AND CORRECTION OF AN IMAGE CAPTURED IN A DIGITAL CAMERA

BACKGROUND OF THE INVENTION

1. Field of the Invention

This invention relates to digital cameras, and more particularly to a method and apparatus for performing color adjustment upon images taken with a digital camera.

2. Description of Related Art

Digital still cameras are being developed today to allow an image to be captured, digitized, stored, and reproduced using conventional printers coupled to a conventional personal computer. Inmost cases, an array of charge-coupled-device (CCD) detectors are used to capture the image. Each detector of the CCD array is used to capture one portion of the image. When light is received by a CCD detector, an electrical charge representative of the intensity of the light to which the detector has been exposed is accumulated. This charge can be coupled to an A/D (analog to digital) converter. The A/D convertor produces a digital value that represents the charge on each of the detectors, and thus the intensity of the light received by each detector.

If a color image is to be captured, then color filters are placed before each detector of the CCD array. Accordingly, a detector which is associated with a filter that passes essentially only red light will form a red detector. The color detectors are frequently arranged in groups. For example, in one well known arrangement, two green detectors, a blue detector, and a red detector form a two by two grouping. This grouping is repeated throughout the array of detectors. By taking the digital value associated with each detector, the color composition of the image is captured.

One problem that is encountered is that the amount of color detected by each detector may be altered due to the composition of the spectrum of light emitted by the particular light source which illuminates the image. For example, if an image is illuminated by a tungsten light source, then the image will be shifted toward the red spectrum, since tungsten light sources emit more red light than blue or green light. This shift will give the resulting photograph an undesirable reddish/orangish appearance.

In accordance with one method that has been used to process an image to adjust for differences in the nature of the light, variable gain amplifiers are provided in line with the red and blue signals. The amount of gain applied to the red and blue signals is adjusted to compensate for the type of light which illuminates the image. A manual control on the camera allows the user to select between tungsten mode and daylight mode. In tungsten mode, the gains of the amplifiers that are responsible for amplifying the output from the red and blue detectors are set to a first gain ratio to compensate for the blue shift. In daylight mode, a second gain ratio is used which causes the gain of the amplifiers responsible for amplifying the red and blue signals to be approximately equal to the amount of gain which is set for the green signals.

Selection of the particular gain ratio is also dependent upon the state of a relay. The relay overrides the manual control when a flash has been charged, since the use of a flash will alter the color composition of the image. That is, the gain ratio of the color signal amplifiers should be essentially the same when capturing an image using a flash device and when capturing an image during daylight. Therefore, when a flash device is charged to illuminate an image, the relay sets the mode of the variable gain amplifiers to the daylight setting, as is appropriate in the case in which a flash is to be used. Thus, by altering the gain of the amplifiers responsible for amplifying the outputs from the red and blue detectors, the color is properly balanced for the case in which an image is to be captured in tungsten lighting, daylight, or when a flash is used.

However, this system can improperly adjust the color of the image that is captured if the flash is charged, but not actually activated. Furthermore, the amount of color adjustment that is preformed is essentially fixed at one of two particular ratios (i.e., the gain of the amplifiers is set to one of two levels). Accordingly, if the amount of color adjustment that is required is other than that which would be desirable if the image were illuminated solely by tungsten or solely by natural sunlight, then the color of the image will be improperly adjusted. Still further, not every tungsten light source will have exactly the same color temperature (spectral composition of wavelengths).

A common way in which digital cameras have attempted to white balance an image requires that a preview image be taken. The preview image is used to determine the amount of adjustment that is required in order to white balance the image. There are several historical reasons why a preview image is used to determine the amount of adjustment that is required to white balance an image that is taken some time later. For example, in the case in which the adjustment is made by adjusting the gain of the amplifiers to which the output from the CCD array is coupled, the white balance information must be known at the time the image is read from the CCD array.

However, the adjustment will be incorrect if the illumination of the image differs between the time the preview image is taken and the time the final image is taken. For example, if the preview image is taken without a flash, and the final image is taken with a flash, then the correction that is made to the final image based upon the characteristics of the preview image will be incorrect. A number of other situations can arise which would cause the illumination of the preview image to differ from the illumination of the final image. For example, the sun may become obscured by a cloud, a light may be turned on or off, etc.

Accordingly, it would be desirable to provide a system wherein the color adjustment is determined in a way that accurately reflects the characteristics of the final image. Furthermore, it would be desirable to provide a system wherein the amount of color adjustment can be adjusted to compensate for several different conditions and combinations of light sources.

SUMMARY OF THE INVENTION

The present invention provides a method and apparatus for performing color balance of an image taken with a digital camera using either a host computer that is external to the camera or in a device internal to the camera using the image data of the image to be white balance adjusted in order to determine the amount of adjustment required.

In accordance with the present invention, a digital image is captured by: first flushing, at a first point in time, any charge which has accumulated on a CCD light detector array; allowing light to strike the CCD detector after the detector has been flushed; and determining the amount of charge that has accumulated upon the detectors that comprise the array. Once the image has been captured, a determination must be made as to whether the image requires white balancing. White balancing is typically required if the light source that illuminates objects to be imaged has a "color temperature" that would cause the image to be tinted or biased in favor of, or away from, one color. For example, a tungsten light source will typically be biased in favor red. Therefore, in order for the image to be properly white balanced, the red component of each pixel must be adjusted with respect to the blue and green components of each pixel.

In accordance with the present invention, the amount of the adjustment which is to be made is determined by analysis of the image data to be adjusted (i.e., the "picture image"). In accordance with one embodiment of the present invention, image pixels within the picture image are mapped into a two dimensional space, the two dimensions of this space being red/blue and green/blue. Image pixels that make up a reference image that was illuminated by a reference light source are then plotted in the two dimensional space. Each of the points at the periphery of the picture image are mapped into points at the periphery of the reference image by a transform. The transforms that are used to map the points in the picture image to the points in the reference image are then plotted in a transform space. A shape is defined in the transform space by the set of transforms associated with each of the points on the periphery of the picture image. Accordingly, a set of such shapes in the transform space will be defined for the picture image. The intersection of these shapes is then used to determine the source of light that illuminates the picture image and the adjustment factors required to properly white balance the picture image.

It will be clear that since the image data to be adjusted is used to determine the amount of the adjustment that is required, the adjustment will be more precise than would be the case if a preview image were taken to determine how to adjust the picture image.

In accordance with one embodiment of the present invention, the analysis and adjustment of the image data is performed in the camera. However, in an alternative embodiment of the present invention, the adjustment is performed outside the camera by a host device, such as a personal computer or printer.

BRIEF DESCRIPTION OF THE DRAWINGS

The objects, advantages, and features of this invention will become readily apparent in view of the following description when read in conjunction with the accompanying drawings, in which.

DETAILED DESCRIPTION OF THE INVENTION

Figure 1:
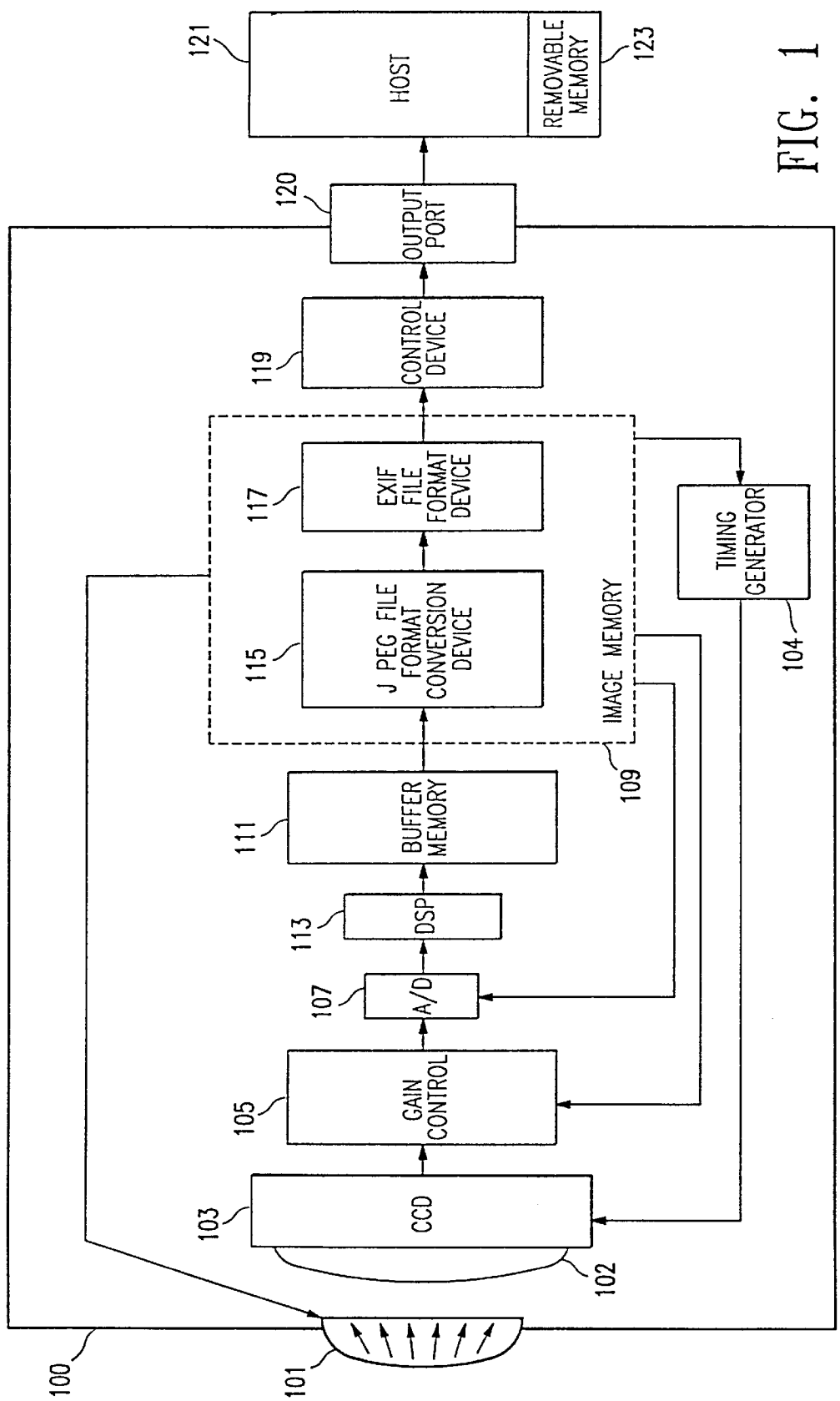
FIG. 1 is a block diagram of a digital camera in accordance with the present invention.

Throughout this description, the preferred embodiment and examples shown should be considered as exemplars, rather than limitations on the present invention.

The present invention provides a method and apparatus for performing automatic white balance on an image captured by a digital camera based upon characteristics of a light source as determined from an analysis of the image data.

FIG. 1 is a block diagram of one embodiment of a digital camera 100 in accordance with the present invention. The digital camera 100 includes: an optical lens 101; an array of charge-coupled-device (CCD) detectors 103, including an array of color filters 102, each filter associated with a detector; a gain control circuit 105; an A/D (analog to digital) convertor 107; a control device 109 (such as a microprocessor), preferably including a JPEG file format conversion device 115 and an EXIF file format device 117; a buffer memory 111; an image processing device 113, such as a DSP (digital signal processor); an image memory device 119; and an output port 120.

Light enters the digital camera 100 through the lens 101 and is focused on the array of CCD detectors 103. As is well known in the art, the color filters 102 associated with each detector within the CCD array 103 cause the detectors to be sensitive to one particular color. In accordance with one embodiment of the present invention, the CCD detectors are configured in a repeating pattern of two by two groups in which the top right detector is sensitive to red light, the top left detector is sensitive to blue green light, the bottom right detector is sensitive to green light, and the bottom left detector is sensitive to blue light. It should be understood that the array of detectors may be fabricated such that the particular detectors are sensitive to other colors and are arranged in other configurations.

Each detector accumulates a charge that is representative of the amount of light in one CCD pixel. A timing generator 104 is coupled to the CCD detector array 103.

The timing generator 104 controls the reading of the CCD detector array 103 in essentially conventional fashion. The timing generator 104 causes the charge accumulated by each detector to be serially applied to the input of the gain control device 105. The control device 109 is coupled to the timing generator and controls the operation of the timing generator 104 in essentially conventional fashion.

The timing generator 104 is capable of flushing the CCD array 103 to essentially discharge any charge previously accumulated the detectors within the array. Once the CCD array 103 has been flushed, the light that passes through the lens and the color filters causes charge to accumulate on each of the detectors within the CCD array 103 in an amount that is proportional to the amount of light that strikes each detector. The charge that accumulates on each detector within the CCD array 103 results in a voltage that is coupled to the gain control circuit 105. The gain control circuit 105 includes an automatic gain control circuit and circuitry to implement a correlated double sampling process. The correlated double sampling process is a conventional process which accounts for overshoot and undershoot in the output from the CCD detectors as the CCD array is read.

The control device 109 is coupled to the gain control device and controls the automatic gain control circuit. The output from the gain control circuit 105 is coupled to the A/D converter 107. The A/D converter 107 converts to digital values the voltages read from the CCD detectors and processed by the gain control circuit 105. The resulting digital values are preferably directly proportional to the amount of light detected by each detector.

The A/D converter 107 is coupled to the DSP 113. The DSP 113 processes the color information and stores it in the buffer memory 111 to provide a demosaic function, to perform automatic white balance, and to sharpen the image. The DSP 113 determines which values are coupled from the A/D converter 107 to the DSP 113 are associated with which detectors by the order in which the values are received from the A/D converter 107. The demosaic function and the automatic white balance functions are conventional functions. For example, in accordance with one embodiment of the present invention, the DSP 113 is a Part No. HD49811TFA commercially available from Hitachi and the automatic white balance function is provided in the HD49811 TFA data sheet distributed by Hitachi. The output from the DSP 113 is a set of image pixels, each of which represent the color of a particular portion of the image that was captured by the CCD detector array 103. Accordingly, the complete set of image pixels comprise the image data. The image data is stored in a buffer memory 111. The buffer memory 111 is read by the control device 109.

In accordance with one embodiment of the present invention, the control device 109 includes a conventional dedicated integrated circuit which performs a JPEG file format conversion. Therefore, in accordance with one embodiment of the present invention, a combination of hardware and software executed within the control device 109 operate together to form a JPEG file format conversion device 115. However, in accordance with another embodiment of the present invention, the JPEG file format conversion device comprises only hardware. Alternatively, the JPEG file format conversion device 115 is a software routine performed within a programmable control device 109. In either case, file format conversion is performed in conventional fashion. In yet another embodiment of the present invention, no compression is performed. In still another embodiment, compression is performed in accordance with a standard other than JPEG.

The JPEG file format conversion process compresses the information output from the DSP 113 and stored in the buffer 111 in accordance with the well known JPEG data compression standard. The information which is in JPEG format is then embedded within a file which conforms to "Digital Still Camera Image File Format Standard" (Version 1.0, Jul. 13, 1995) (commonly known as "EXIF"), defined by the JEIDA Electronic Still Camera Technical Committee. The file is embedded within the EXIF file by an EXIF file format device 117 within the control device 109. In accordance with one embodiment of the present invention, the EXIF file format device is a combination of software executed within the control device 109 and dedicated hardware.

However, in an alternative embodiment, the EXIF file format device 117 is a software routine performed within the control device 109. In yet another embodiment of the present invention, the EXIF file format device 117 comprises only dedicated hardware.

In the preferred embodiment of the present invention, the image information is compressed in accordance with the well known JPEG data compression technique and presented in $YC_bC_r$ format with 4:2:2 subsampling. The EXIF file is then transferred to a host for further processing. However, it should be understood that in accordance with an alternative embodiment of the present invention, the output from the DSP 113 may be formatted in any manner which allows a host 121, such as a personal computer or printer, to read and interpret the information provided by the camera 100 to the host 121. In accordance with one embodiment of the present invention, the image data is not compressed.

In accordance with the present invention, the image data is analyzed to determine how to adjust the digital values in the image data to correct for differences in the characteristics of the light source used to illuminate the image. In accordance with one embodiment of the present invention, the image data is analyzed to determine the amount of adjustment to be applied to the image data to properly white balance the image. The analysis involves mathematical manipulation of the image data which can be performed by a programmable device, such as a microprocessor or DSP either within or external to the camera (e.g., in the host). In accordance with one embodiment of the present invention, the image data is analyzed with respect to a reference image.

The reference image preferably has an essentially fall spectrum of visible wavelengths and is illuminated by a reference light source. The image data for the reference image is mapped into a two dimensional space in which the horizontal axis is red divided by blue and the vertical axis is green divided by blue. This mapping reduces the three dimensional (rgb) points to chromaticity defined by two values (i.e., the red/blue value and the green/blue value). Accordingly, a gamut of points can be plotted in this two dimensional space, each point representing the color of one pixel in the reference image. A set of points which, when connected from one point to the next, define the outer most boundary of this reference gamut are identified. These peripheral points are then saved.

Once the peripheral points of the reference image have been established, a picture image can be analyzed with respect to the reference image by first mapping the picture image into the two-dimensional space such that each pixel defines a point in the two-dimensional space. Then peripheral points for the picture image are determined. Each one of these points are then mapped to one of the peripheral points of the reference image. The transform that is used to map the peripheral point of the picture image to the peripheral point of the reference image is then defined by two values. The first value is the quotient of the red/blue values, and the second value is the quotient of the green/blue values. Each set of transforms associated with one point of the picture image and mapped to each point in the reference image will define a shape. Therefore, a set of shapes will be defined by mapping each of the points in the picture image to each of the points in the reference image. The intersection of these shapes defines a new shape 52. This new shape can then be analyzed to determine the light source which most likely was used to illuminate the scene.

It should be understood that in an alternative embodiment of the present invention, the image data may be analyzed by any other methods for determining the adjustment required to color balance the image.

In another embodiment of the present invention, the device for analyzing the image data is provided within the camera. For example, in one embodiment of the present invention, the DSP 113 performs the analysis of the image data. As a result of the analysis of the image data, the color of the image pixels that make-up the image are adjusted to achieve proper white balance. It should be understood that the image data may not be compressed, or the compression may be applied after either analysis of the image data or after the adjustments to the color balance are made.

A number of embodiments of the present invention have been described. Nevertheless, it will be understood that various modifications may be made without departing from the spirit and scope of the invention. Furthermore, the components of the digital camera are described as one example of devices which perform particular functions within a digital camera. Accordingly, the functions which are described as being performed within the digital camera may be performed by any device that is capable of performing the particular functions. For example, the control device 109 may be a microprocessor, an application specific integrated circuit, a discrete circuit, a state machine, or any other circuit or component that is capable of performing the functions that are described above. Accordingly, it is to be understood that the invention is not to be limited by the specific illustrated embodiments, but only by the scope of the appended claims.

What is claimed is:

1. A digital camera, comprising:

a lens;

a plurality of color filters adjacent the lens;

an array of detectors for each receiving through the lens and a corresponding one of the color filters light reflected from a scene and outputting a signal representative of an amount of light detected;

circuit means connected to the array for processing the signals from the detectors and generating a set of digital image data including a red-green-blue (rgb) value for each of a plurality of pixels representing an uncorrected image of the scene; and control means for mapping a two-dimensional gamut representation of the digital image data into a two-dimensional gamut representation of a set of reference image data and adjusting selected ones of the values of the set of digital image data in accordance with a predetermined transform to white balance the uncorrected image of the scene and produce a modified set of digital image data representing a corrected image of the scene, the control means performing the two-dimensional mapping by reducing each of the rgb values in the digital image data to a red/blue value and a green/blue value and generating the two-dimensional gamut representing a map of the red/blue and green/blue values for each pixel in the digital image data, generating a set of two-dimensional shapes through plotting the transforms that map each of a plurality of peripheral points of the two-dimensional gamut into a plurality of peripheral reference image gamut points, and then adjusting the selected ones of the values of the set of digital image data based on the intersection of the set of two-dimensional shapes to white balance the uncorrected image of the scene and produce a modified set of digital image data representing a corrected image of the scene.

2. The digital camera according to claim 1 wherein the control means includes a JPEG file format conversion device.

3. The digital camera according to claim 1 wherein the control means includes an EXIF file format device.

4. The digital camera according to claim 1 wherein the circuit means includes a gain control circuit and an analog to digital converter circuit connected to the control means.

5. The digital camera according to claim 4 wherein the circuit means includes a timing generator connected between the control means and the gain control circuit.

6. The digital camera according to claim 1 and further comprising a memory for storing the modified set of digital image data representing the corrected image of the scene.

7. A method of white balance detection and correction of an image captured in a digital camera, comprising the steps of:

generating a set of digital image data including a red-green-blue (rgb) value for each of a plurality of pixels representing an uncorrected image of the scene; and mapping a two-dimensional gamut representation of the digital image data into a two-dimensional gamut representation of a set of reference image data and adjusting selected ones of the values of the set of digital image data in accordance with a predetermined transform to white balance the uncorrected image of the scene and produce a modified set of digital image data representing a corrected image of the scene, the two-dimensional mapping being performed by reducing each of the rgb values in the digital image data to a red/blue value and a green/blue value, and generating the two-dimensional gamut representing a map of the red/blue and green/blue values for each pixel in the digital image data, generating a set of two-dimensional shapes through plotting the transforms that map each of a plurality of peripheral points of the two-dimensional gamut into a plurality of peripheral reference image gamut points, and then adjusting the selected ones of the values of the set of digital image data based on the intersection of the set of two-dimensional shapes to white balance the uncorrected image of the scene and produce a modified set of digital image data representing a corrected image of the scene.

8. The method of claim 7 wherein the set of digital image data is generated with a plurality of color filters adjacent a lens, an array of detectors for each receiving through the lens and a corresponding one of the color filters light reflected from a scene and outputting a signal representative of an amount of light detected, and a circuit connected to the array for processing the signals from the detectors.

9. The method of claim 7 wherein the set of digital image data is generated within a digital camera and the set of digital image data is mapped and adjusted to white balance the uncorrected image of the scene by a processor contained within the digital camera.

10. The method of claim 7 wherein the set of digital image data is generated within a digital camera and the set of digital image data is mapped and adjusted to white balance the uncorrected image of the scene by a host computer connected to the digital camera.

11. The method of claim 7 wherein the reference image data represents a full spectrum of visible wavelengths as illuminated by a reference light source.

12. A color image processing system, comprising:

a plurality of color filters;

an array of detectors for each receiving through a corresponding one of the color filters light reflected from a scene and outputting a signal representative of an amount of light detected;

circuit means connected to the array for processing the signals from the detectors and generating a set of digital image data including a red-green-blue (rgb) value for each of a plurality of pixels representing an uncorrected image of the scene; and control means for mapping a two-dimensional representation of the digital image data into a two-dimensional representation of a set of reference image data and adjusting selected ones of the values of the set of digital image data in accordance with a predetermined transform to white balance the uncorrected image of the scene and produce a modified set of digital image data representing a corrected image of the scene, the control means performing the two-dimensional mapping by reducing each of the rgb values in the digital image data to a red/blue value and a green/blue value and generating the two-dimensional gamut representing a map of the red/blue and green/blue values for each pixel in the digital image data, generating a set of two-dimensional shapes through plotting the transforms that map each of a plurality of peripheral points of the two-dimensional gamut into a plurality of peripheral reference image gamut points, and then adjusting the selected ones of the values of the set of digital image data based on the intersection of the set of two-dimensional shapes to white balance the uncorrected image of the scene and produce a modified set of digital image data representing a corrected image of the scene.

* * * * *